US011259069B1

(12) United States Patent
Hsieh et al.

(10) Patent No.: US 11,259,069 B1
(45) Date of Patent: Feb. 22, 2022

(54) SYNCHRONIZED VIDEO PLAYER

(71) Applicant: VisualOn, Inc., San Jose, CA (US)

(72) Inventors: Cheng-Ta Hsieh, San Jose, CA (US);
Hyoheon Hong, Seongnam (KR);
Huan-Chih Tsai, Saratoga, CA (US);
Ming-Mao Chiang, Zhubei (TW);
Yubao Li, Shanghai (CN)

(73) Assignee: VisualOn, Inc., Campbell, CA (US)

( * ) Notice: Subject to any disclaimer, the term of this patent is extended or adjusted under 35 U.S.C. 154(b) by 54 days.

(21) Appl. No.: 16/782,893

(22) Filed: Feb. 5, 2020

(51) Int. Cl.
*H04N 21/43* (2011.01)
*H04N 21/4402* (2011.01)
*H04N 21/436* (2011.01)
*H04N 21/414* (2011.01)

(52) U.S. Cl.
CPC ....... *H04N 21/4305* (2013.01); *H04N 21/414* (2013.01); *H04N 21/436* (2013.01); *H04N 21/440245* (2013.01)

(58) Field of Classification Search
CPC ............. H04N 21/4305; H04N 21/414; H04N 21/436; H04N 21/440245; H04N 21/4307; H04N 21/43072; H04N 21/43074; H04N 21/43076; H04N 21/43078; H04N 21/43079; H04L 7/0012
USPC ........................................................ 386/201
See application file for complete search history.

(56) References Cited

U.S. PATENT DOCUMENTS

| 9,621,613 | B1* | 4/2017 | Huang | H04N 21/2393 |
| 2003/0142752 | A1* | 7/2003 | Demas | H04N 19/89 |
| | | | | 375/240.27 |
| 2014/0195651 | A1* | 7/2014 | Stockhammer | H04N 21/26258 |
| | | | | 709/219 |
| 2015/0120953 | A1* | 4/2015 | Crowe | H04L 65/80 |
| | | | | 709/231 |
| 2016/0007080 | A1* | 1/2016 | Dees | H04N 21/233 |
| | | | | 725/37 |
| 2017/0181113 | A1* | 6/2017 | Keyser-Allen | H04N 21/4307 |
| 2017/0251040 | A1* | 8/2017 | Archambault | H04N 21/4305 |
| 2018/0367483 | A1* | 12/2018 | Rodriguez | H04L 51/04 |
| 2020/0145701 | A1* | 5/2020 | Liu | H04N 9/8205 |

* cited by examiner

*Primary Examiner* — John W Miller
*Assistant Examiner* — Sean N. Haiem
(74) *Attorney, Agent, or Firm* — Van Pelt, Yi & James LLP

(57) ABSTRACT

A system for providing video playback comprises a processor configured to synchronize clocks on the plurality of devices to a standard time, provide target video playback positions to the plurality of devices, wherein target video playback positions are based at least in part on the timing information, provide one or more locators for video streams to the plurality of devices, monitor playback status for each of the plurality of devices, and for a device, determine whether the playback status for the device indicates that a selected bitrate is too low or too high or that the playback is fast or slow; in response to determining the selected bitrate is too low, indicate to select a higher bitrate for a device; and in response to determining the selected bitrate is too high, indicate to select a lower bitrate for the device.

18 Claims, 11 Drawing Sheets

SYNCHRONIZED VIDEO PLAYER

BACKGROUND OF THE INVENTION

Many applications exist where synchronization of streaming video between multiple screens is required. For example, a video is distributed by a streaming server to be displayed on a set of screens in a room, a video is distributed by a streaming server to be split across a set of adjacent screens, multiple angles of an event are distributed by a streaming server to a set of screens, etc. Ensuring the video is synchronized is crucial to viewer enjoyment. Variable network conditions and device capability can cause playback to occur at different rates for different devices, creating a problem where the devices become unsynchronized.

BRIEF DESCRIPTION OF THE DRAWINGS

Various embodiments of the invention are disclosed in the following detailed description and the accompanying drawings.

DETAILED DESCRIPTION

Figure 1:
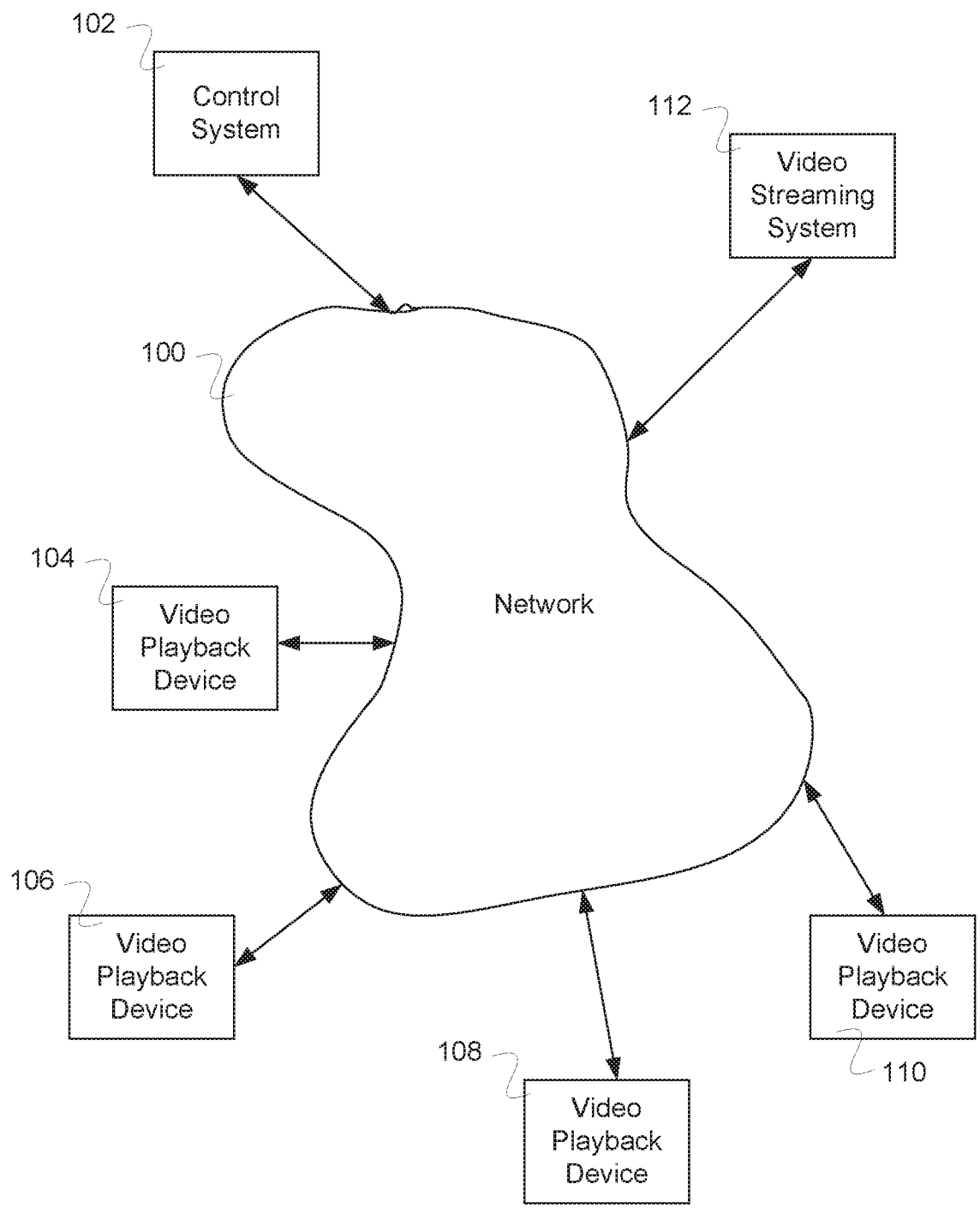
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for providing video playback is disclosed. The system comprises an interface and a processor. The interface is configured to receive a desired video playback request for a plurality of devices and receive timing information from the plurality of devices. The processor is configured to synchronize clocks on the plurality of devices to a standard time, provide target video playback positions to the plurality of devices, wherein target video playback positions are based at least in part on the timing information, provide one or more locators for video streams to the plurality of devices, monitor playback status for each of the plurality of devices, and for a device of the plurality of devices, and determine whether the playback status for the device of the plurality of devices indicates that a selected bitrate is too low or too high or that a playback is fast or slow.

In various embodiments, in response to determining that the playback is fast, indicate to decrease playback speed or pause on the device; in response to determining that the playback is slow, indicate to increase playback speed or drop frames on the device; in response to determining the selected bitrate is too low, indicate to select a higher bitrate for a device of the plurality of devices; and/or in response to determining the selected bitrate is too high, indicate to select a lower bitrate for the device of the plurality of devices, or any other appropriate response.

The system maintains the synchronization of the video streams on the plurality of devices by maintaining clock synchronization on the devices, dynamically adapting a target playback position relative to the clock. Each device can receive the target playback position indicated by the system to speed up or slow down playback to achieve synchronized playback.

The system for providing video playback begins a video streaming process by registering a plurality of devices. Registration information for the plurality of devices is received and stored. The clocks of the plurality of devices are synchronized to the control system server. In some embodiments, instead of using the control system server time, a standard time is received from a time standard and the clocks on the plurality of devices are synchronized to the standard time, using any appropriate network time synchronization algorithm (e.g., network time protocol). A video playback request is received for the plurality of devices. For example, each device requests a stream from a set of one or more streams (e.g., one stream is distributed, a plurality of streams comprising angles of an event are distributed, etc.). The video playback request can include layout information indicating a portion of a video frame to display (e.g., indicating cropping information—for example, for displaying a video stream divided between a set of displays). The control server then provides the video stream information (e.g., a locator such as a uniform resource locator (URL) or a uniform resource identifier (URI)) and monitoring playback status for each device, including a playback location offset from the desired playback location (e.g., current playback position and device clock information), a rebuffering rate, and a frame drop rate. Based on the playback status, the control server is able to determine whether to raise or lower the selected bit rate of the video stream consumed by the devices. Each device will adjust the selected bitrate and playback speed accordingly. Each device additionally provides timing information indicating a delay time after each video frame is displayed. The delay time comprises an offset time between the video frame position and the current time. The control server determines an average delay time and provides the average delay time to each device as a target playback position (e.g., an indication of the next frame to display). As playback continues, the control server continues to monitor playback status and adjust the selected bit rate for each device to account for changing network conditions, and receive timing information and provide updated target video playback positions to ensure the video remains synchronized. The system for video playback improves the computer system by allowing video to be distributed via internet streaming techniques to a plurality of video playback devices while ensuring that the video is synchronized between the devices, while accounting for changing network conditions and device capability.

In some embodiments, the control server does not serve the video stream. The video stream is served by a video streaming server. For example, a video stream from You-Tube/Google servers is synchronized using the control server.

In some embodiments, devices are synchronized in time with the server. Each time when the server sends the target playback position to devices, it sends a tuple (target playback position, my clock). For example, the sever sends (10 sec, 12:00:04 pm), then when device receives the info at 12:00:05 pm, it knows it should translate the target to (11 sec, 12:00:05 pm), i.e., shift one second. Note that the accuracy of the time is usually in milliseconds or even micro seconds. As long as the system (devices & control server) clocks are synchronized, the time does not need to synchronize up with an atomic clock or standard time.

In some embodiments, playback positions are communicated by an associated playback position with the time (assuming the clock has been synchronized). For example, the video position 10 sec is being played at 12:00:05 pm, then the tuple (10 sec, 12:00:05 pm) is sent to the server or the devices. By doing this, the tuple is independent of network delay. For example, if (10 sec, 12:00:05 pm) is received at 12:00:06 pm, then the server or device can translate it to (11 sec, 12:06 pm).

In some embodiments, the target video position can be an average of playback positions. For example, (8 sec, 12:00:05 pm), (8 sec, 12:00:04 pm), (11 sec, 12:00:06 pm) are received by server at 12:00:07 pm. First, the server adjusts the tuples to current time: (10 sec, 12:00:07 pm), (11 sec, 12:00:07 pm), (12 sec, 12:00:07 pm), then the average is (11 sec, 12:00:07 pm). The target video position can be a maximum or minimum of the playback position or any other calculation methods decided by the server.

In various embodiments, playback position is adjusted when the playback position is behind by speeding up playback rate (e.g., 1.2×the normal speed), skipping frames (e.g., dropping 1 second of video if the video playback position is one second behind), or any other appropriate manner of adjusting position.

In various embodiments, playback position is adjusted when the playback position is ahead by slowing down playback rate (e.g., 0.8×the normal speed), pausing playback (e.g., pause 1 second of video if the video playback position is one second ahead), or any other appropriate manner of adjusting position.

In some embodiments, in response to all the playback devices in the local area encounter a low band width situation, then the server can tell all the devices to select lower bit rate streams. With the feedback from all the devices, the control server can help the overall playback become smoother on all devices, if they share the same internet connection. This improves the system over simple local device control because of the advantage of having a central server control.

In some embodiments, if some of the devices cannot sustain high bitrate playback due to hardware limitation, then the server can also coordinate all devices to consume lower bitrate streams to avoid the situation of mismatched bitrates across displays.

In some embodiments, There are two factors impact the playback: 1) selected bitrate (for video quality of whole system); and 2) target playback position (for synchronized play). Selected bitrate is the bitrate of the video stream selected by the device to download. Usually one video title consists of various streams with different bitrates, say 500 kbit/sec, 1 Mbit/sec, 5 Mbit/sec (say 480p, 720p, or HD). The device can choose an appropriate one to download, according to its network bandwidth and decoding power. A lower bitrate does not speed up the playback if it's played at normal speed, but it can reduce the chance of dropped frames or rebuffering. In some cases, the controller can coordinate all the devices to achieve better bandwidth usage, if all the devices download the video content from a shared internet connection. In some cases, if selected bitrates are too high on devices, then the local area network may not have enough bandwidth for all devices, or some devices may not be able to decode the video in time (i.e., a high bitrate takes longer to decode). So rebuffering or dropped frames will occur. This is bad for user experience. If selected bitrates are too low, then the overall video quality/resolution suffers. Also, if a rebuffer occurs on some devices, playback positions of those devices will lag behind others.

In some embodiments, each device sends current playback position to controller. The controller receives device playback positions and then calculated updated target position. Each device receives target playback positions and decides whether it needs to catch up or slow down.

In some embodiments, both selected bitrate and target playback position are proposed by controller, executed by devices.

FIG. 1 is a block diagram illustrating an embodiment of a network system. In some embodiments, the network system of FIG. 1 comprises a network system for a system for providing video playback. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Control system 102, video playback system 104, video playback system 106, video playback system 108, video playback system 110, and video streaming system 112 communicate via network 100.

Control system 102 comprises a control system for controlling video playback on a plurality of video playback devices—for example, control system 102 comprises a control system for monitoring and controlling synchronized video to video playback system 104, video playback system 106, video playback system 108, and video playback system 110. Video streaming system 112 provides video streams for playback to video playback system 104, video playback system 106, video playback system 108, and video playback system 110 and monitored and controlled using control system 102. For example, control system 102 comprises a system for monitoring and controlling video playback—comprising an interface configured to receive a desired video playback request for a plurality of devices and receive timing information from the plurality of devices, and a processor configured to synchronize clocks on the plurality of devices to a standard time, provide target video playback positions to the plurality of devices, wherein target video playback positions are based at least in part on the timing information, provide one or more locators for video streams to the plurality of devices, monitor playback status for each of the plurality of devices, and for a device of the plurality of devices, determine whether the playback status for the device indicates that the playback is slow, and in response to determining the playback is slow, lower a bit rate to the device. Video playback system 104, video playback system 106, video playback system 108, and video playback system 110 comprise video playback systems for playing back streaming video distributed by control system 102.

Figure 2A:
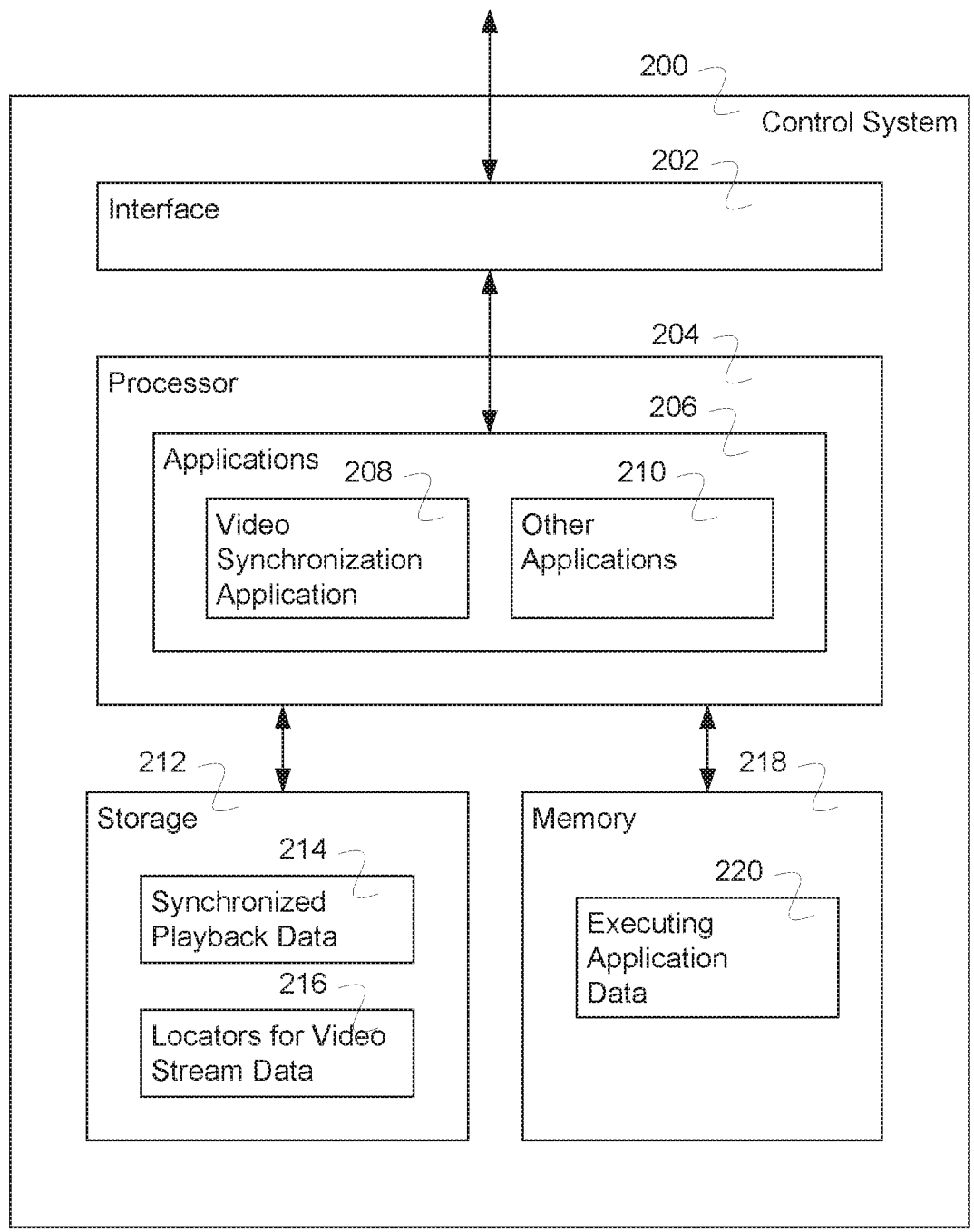
FIG. 2A is a block diagram illustrating an embodiment of a control system.

FIG. 2A is a block diagram illustrating an embodiment of a control system. In some embodiments, control system 200 comprises control system 102 of FIG. 1. In the example shown, control system 200 comprises interface 202. For example, interface 202 comprises an interface for receiving data, providing data, receiving a request for data, receiving a desired video playback request, receiving timing information, etc. Processor 204 comprises a processor for executing applications 206. Applications 206 comprises video synchronization application 208 and other applications 210. For example, video synchronization application 208 comprises an application configured to synchronize clocks on the plurality of devices to a standard time, provide target video playback positions to the plurality of devices, wherein target video playback positions are based at least in part on the timing information, provide one or more locators for video streams to the plurality of devices, monitor playback status for each of the plurality of devices, and for a device of the plurality of devices, determine whether the playback status for the device indicates that the playback is slow, and in response to determining the playback is slow, lower a bit rate to the device. Other applications 210 comprise any other appropriate applications (e.g., a communications application, a data storage and retrieval application, a web browser application, a user interface application, a data analysis application, etc.). Storage 212 comprises synchronized playback data 214 (e.g., timing information from a plurality of devices, playback status information for a plurality of devices, a current video position, video layout data for a plurality of devices, etc.) and locators for video stream data 216 (e.g., a set of URI/URL locators for video stream frames, etc.). Memory 218 comprises executing application data 220 comprising data associated with applications 206.

Figure 2B:
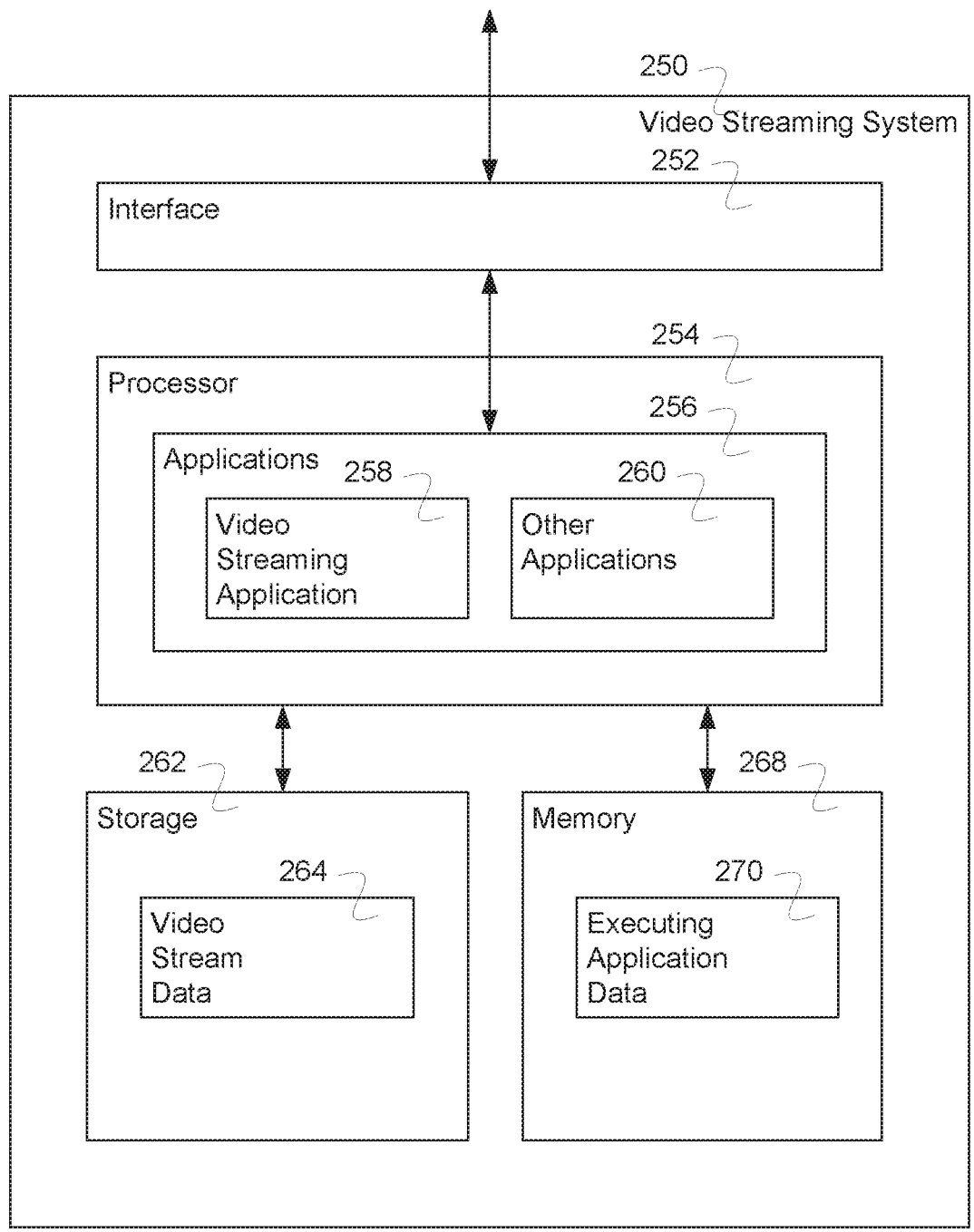
FIG. 2B is a block diagram illustrating an embodiment of a video streaming system.

FIG. 2B is a block diagram illustrating an embodiment of a video streaming system. In some embodiments, video streaming system 250 comprises video streaming system 112 of FIG. 1. In the example shown, video streaming system 250 comprises interface 252. For example, interface 252 comprises an interface for receiving a request for a video stream, providing a video stream, etc. Processor 254 comprises a processor for executing applications 256. Applications 256 comprises video streaming application 258 and other applications 210. For example, video streaming application 258 comprises an application configured to provide synchronized streams to the plurality of devices to a standard time. Other applications 210 comprise any other appropriate applications (e.g., a communications application, a data storage and retrieval application, a web browser application, a user interface application, a data analysis application, etc.). Storage 262 comprises video stream data 264 (e.g., one or more video streams). Memory 268 comprises executing application data 270 comprising data associated with applications 256.

Figure 3:
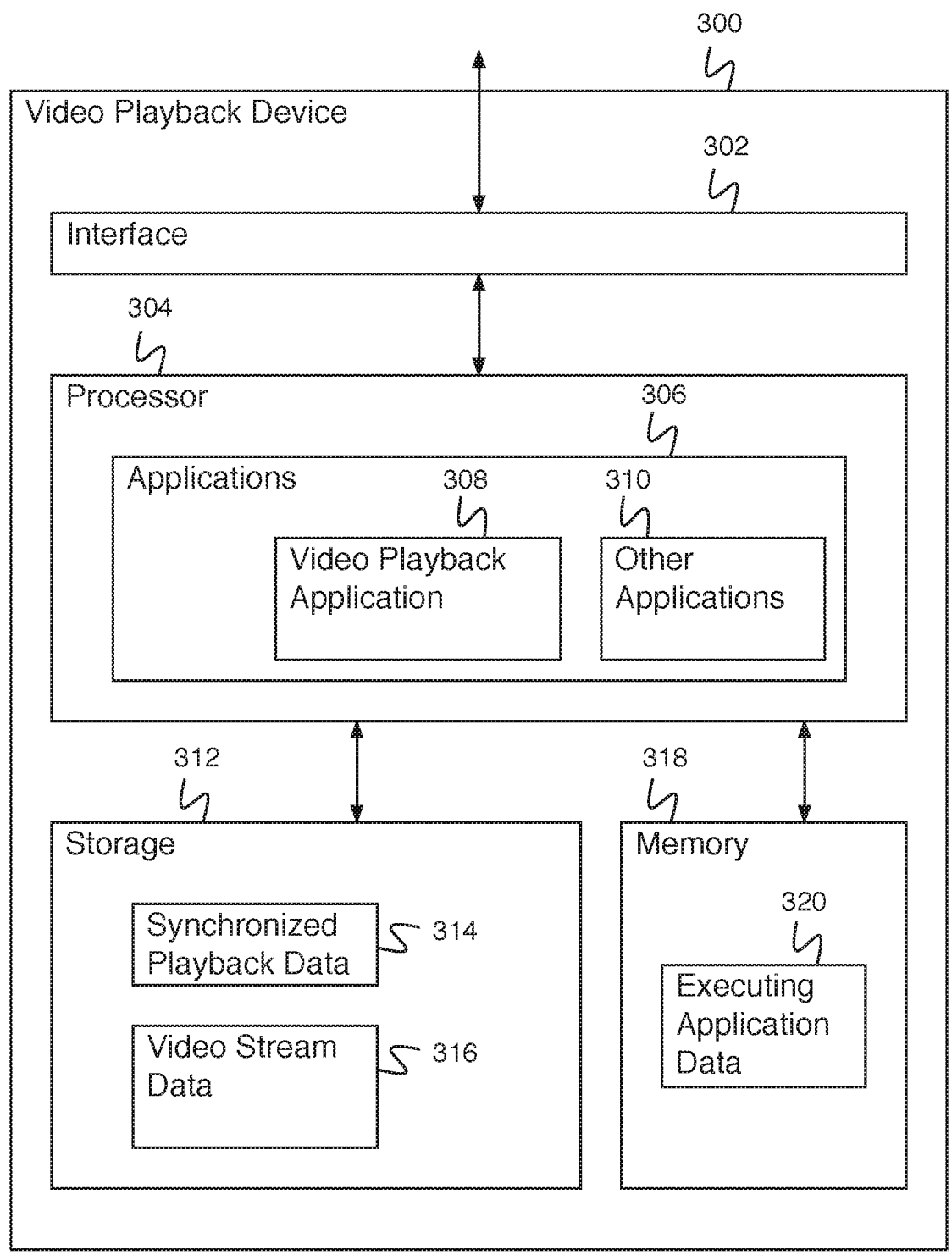
FIG. 3 is a block diagram illustrating an embodiment of a video playback device.

FIG. 3 is a block diagram illustrating an embodiment of a video playback device. In some embodiments, video playback device 300 comprises video playback device 104 of FIG. 1, video playback device 106 of FIG. 1, video playback device 108 of FIG. 1, or video playback device 110 of FIG. 1. In the example shown, video playback device 300 comprises interface 302. For example, interface 302 comprises an interface for receiving data, providing data, receiving a request for data, receiving one or more locators for video stream(s), providing a request to an appropriate locator of the one or more locators for video stream(s), receiving a video stream, receiving a target playback position, etc. Processor 304 comprises a processor for executing applications 306. Applications 306 comprises video playback application 308 and other applications 310. For example, video playback application 308 comprises an application configured to provide registration information to a control server, provide a video playback request, displaying a video frame, providing playback status information, receive a playback speed instruction, and receiving a bit rate adjustment.

Other applications 310 comprises any other appropriate applications (e.g., a communications application, a data storage and retrieval application, a web browser application, a user interface application, a data analysis application, etc.). Storage 312 comprises synchronized playback data 314 (e.g., timing information, playback status information, a current video position, video layout data, etc.) and video stream data 316 (e.g., a set of video stream frames, etc.). Memory 318 comprises executing application data 320 comprising data associated with applications 306.

Figure 4:
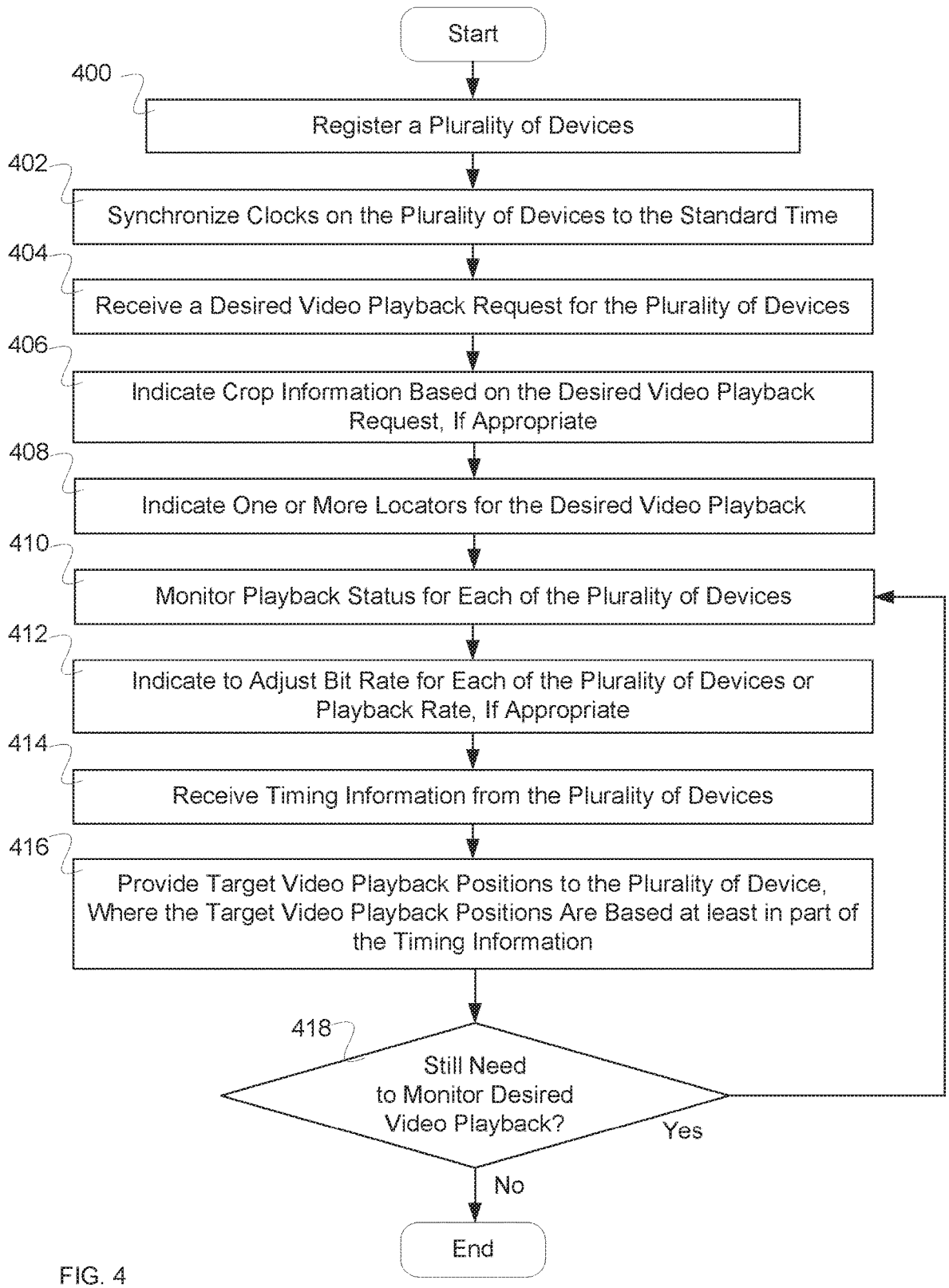
FIG. 4 is a flow diagram illustrating an embodiment of a process for providing video playback.

FIG. 4 is a flow diagram illustrating an embodiment of a process for providing video playback. In some embodiments, the process of FIG. 4 is executed by control system 102 of FIG. 1. In the example shown, in 400, a plurality of devices are registered. For example, registering a plurality of devices comprises receiving registration information from a plurality of devices and storing the registration information from the plurality of devices. In 402, clocks on the plurality of devices are synchronized to the standard time. For example, clocks on the plurality of devices are synchronized to the time of the control system or to a timing standard (e.g., using the network time protocol (NTP)). In 404, a desired video playback request is received for the plurality of devices. For example, the desired video playback request comprises a plurality of streams on the plurality of devices (e.g., different streams for playback on different devices) or a single stream on the plurality of devices (e.g., the single stream for playback on each device). In some embodiments, the desired video playback request comprises layout information indicating a portion of the video to stream. In 406, indicate crop information based on the desired video playback request, if appropriate. For example, if appropriate, indicate cropping information for a video stream according to layout information of the video playback request. For example, the decoded video is cropped by the video playback devices according to layout information received in 406 in order to divide, if indicated, the video playback between a set of displays. Or for example, the decoded video is cropped by a video streaming server according to layout information received in 404 in order to divide, if indicated, the video playback between a set of displays. In 408, one or more locators for the desired video playback is indicated. For example, one or more locators for source(s) of video streams (e.g., a video streaming source address) are provided to the plurality of devices. In 410, playback status is monitored for each of the plurality of devices. In 412, a bit rate for each of the plurality of devices or playback rate is adjusted, if appropriate. For example, adjusting a bit rate or playback rate for a device comprises adjusting the resolution of video streaming to the device or the rate of playback on the device in order to make sure that devices are synchronized. In some embodiments, one or more bit rates are adjusted down or the playback rates are adjusted faster or slower so that devices are able to keep up with the rest. In 414, timing information is received from the plurality of devices. For example, timing information comprises a delay time indicating a time offset between a playback position and a clock time. In 416, target video playback positions are provided to the plurality of devices, wherein the target video playback positions are based at least in part on the timing information. In 418, it is determined whether there is still need to monitor desired video playback. In response to there still being a need to monitor desired video playback, control passes to 410. In response to there not still being a need to monitor desired video playback, the process ends.

Figure 5:
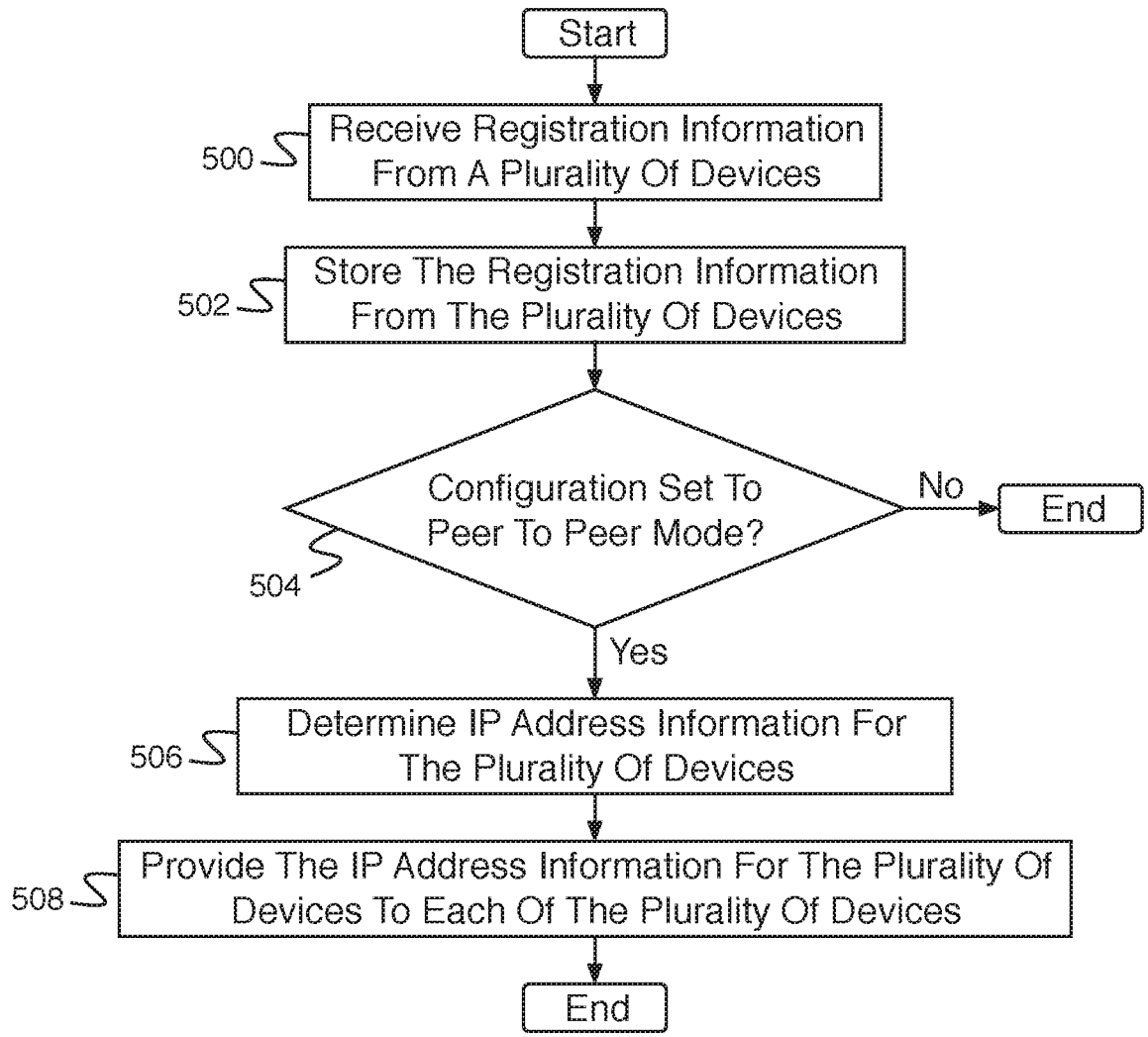
FIG. 5 is a flow diagram illustrating an embodiment of a process for registering a plurality of devices.

FIG. 5 is a flow diagram illustrating an embodiment of a process for registering a plurality of devices. In some embodiments, the process of FIG. 5 implements 400 of FIG. 4. In the example shown, in 500, registration information is received from a plurality of devices. For example, registration information comprises a device name, a device internet protocol (e.g., IP) address, a device display type, a device preferred bandwidth, etc. In 502, the registration information from the plurality of devices is stored. In 504, it is determined whether the configuration is set to a peer to peer mode. For example, the configuration is set by a system administrator. A peer to peer mode comprises a mode wherein video streaming data is transferred directly between two or more video playback devices. In response to determining that the configuration is not set to a peer to peer mode, the process ends. In response to determining that the configuration is set to a peer to peer mode, control passes to 506. In 506, IP address information is determined for the plurality of devices. In 508, IP address information for the plurality of devices is provided to each device of the plurality of devices.

Figure 6:
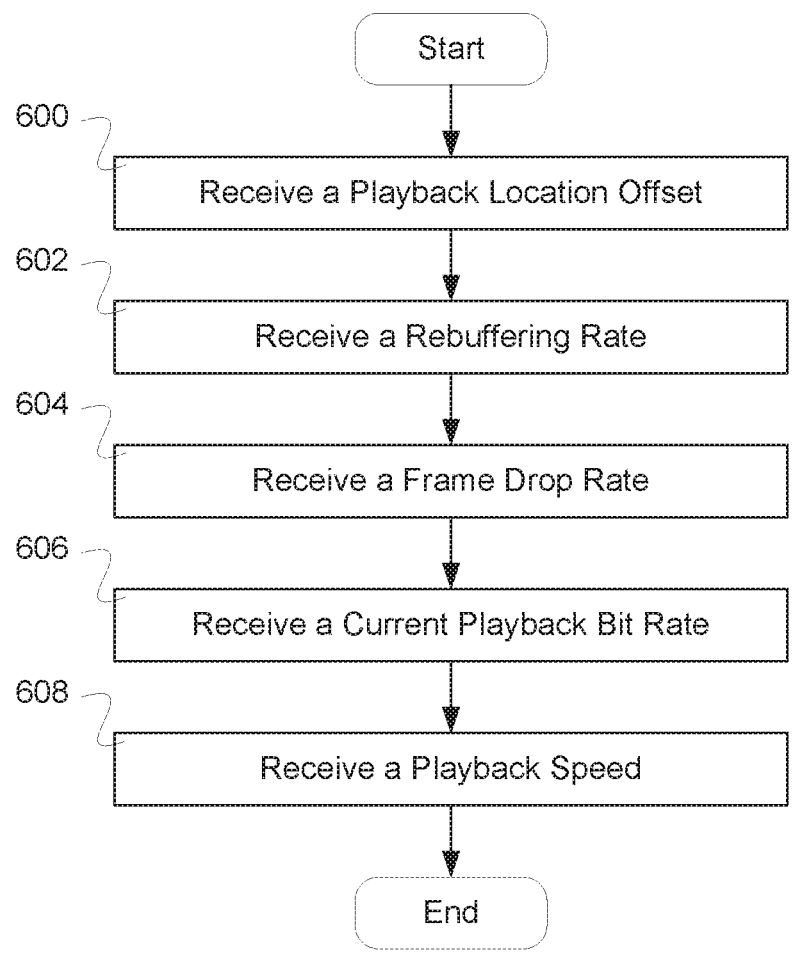
FIG. 6 is a flow diagram illustrating an embodiment of a process for monitoring playback status.

FIG. 6 is a flow diagram illustrating an embodiment of a process for monitoring playback status. In some embodiments, the process of FIG. 6 implements 410 of FIG. 4. In the example shown, in 600, a playback location offset is received. For example, a playback location offset comprises a difference between a desired playback location and an actual playback location. In 602, a rebuffering rate is received. For example, a rebuffering rate comprises a time percentage that rebuffering is occurring, a number of times per second that rebuffering occurs, etc. In 604, a frame drop rate is received. For example, a frame drop rate comprises a number of frames per second that are dropped (e.g., not displayed because the video data is not ready in time). In 606, a current playback bit rate is received. For example, a bit rate of a current video stream being played back. In 608, a playback speed is received. For example, a playback speed is received—for example, 0.8, 0.9, 1.0, 1.1, 1.2 rate playback.

Figure 7:
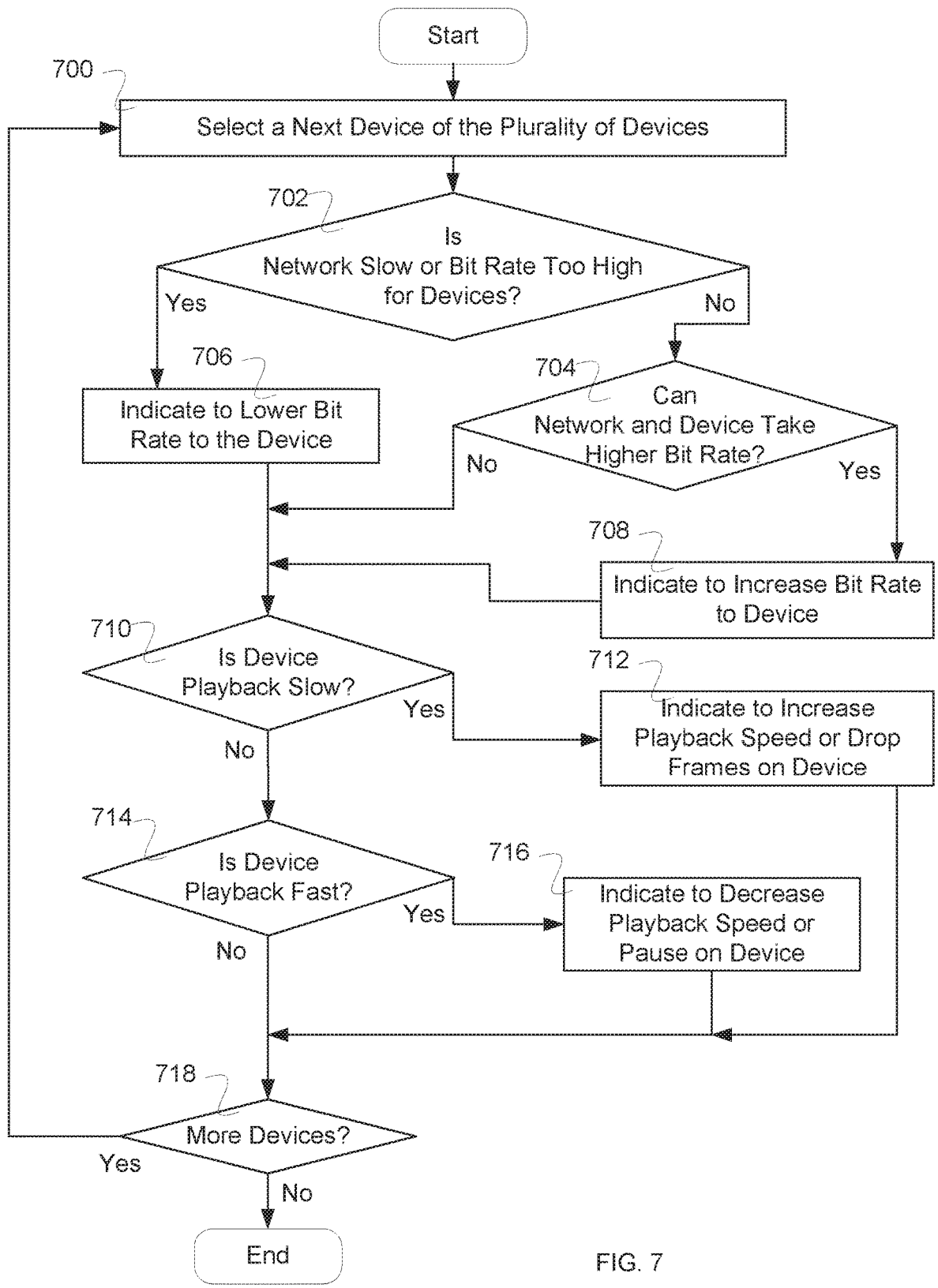
FIG. 7 is a flow diagram illustrating an embodiment of a process for adjusting a bit rate for each of a plurality of devices, if appropriate.

FIG. 7 is a flow diagram illustrating an embodiment of a process for adjusting a bit rate and playback rate for each of a plurality of devices, if appropriate. In some embodiments, the process of FIG. 7 implements 412 of FIG. 4. In the example shown, in 700, a next device of the plurality of devices is selected. In 702, it is determined whether the network is slow or the bit rate is too high for devices. In response to the network being slow or the bit rate being too high for devices, control passes to 706. In 706, it is indicated to lower the bit rate to the device, and control passes to 710. In response to the network not being slow or the bit rate not being too high for devices, in 704 it is determined whether the network and device can take a higher bit rate. In response to the network and device being able to take a higher bit rate, in 708 it is indicated to increase bit rate to the device and control passes to 710. In response to the network and device not being able to take a higher bit rate, control passes to 710.

In 710, it is determined whether the device playback is slow. In response to the device playback being slow, control passes to 712. In 712, it is indicated to increase playback speed or drop frames on the device, and control passes to 718. In response to the device playback not being slow, control passes to 714. In 714, it is determined whether the device playback is fast. In response to the playback being fast, control passes to 716. In 716 it is indicated to decrease playback speed or pause on the device, and control passes to 718. In response to the device playback not being fast, control passes to 718.

In 718, it is determined whether there are more devices. In response to determining that there are more devices, control passes to 700. In response to determining that there are not more devices, the process ends.

Figure 8:
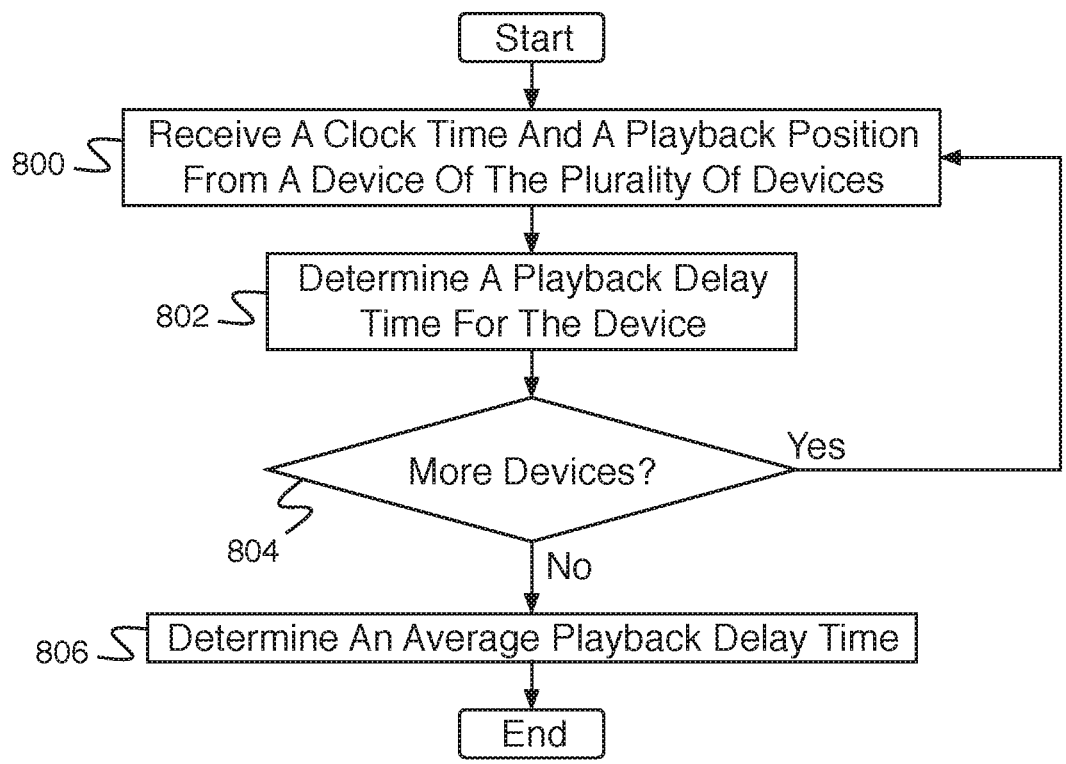
FIG. 8 is a flow diagram illustrating an embodiment of a process for receiving timing information from a plurality of devices.

FIG. 8 is a flow diagram illustrating an embodiment of a process for receiving timing information from a plurality of devices. In some embodiments, the process of FIG. 8 implements 414 of FIG. 4. In the example shown, in 800, a clock time and a playback position are received from a device of the plurality of devices. In 802, a playback delay time for the device is determined. For example, the playback delay time for the device comprises the playback position minus the clock time. In 804, it is determined whether there are more devices (e.g., more devices of the plurality of devices that have not provided a clock time and a playback position). In response to determining that there are more devices, control passes to 800. In response to determining that there are not more devices, control passes to 806. In 806, an average playback time is determined. In some embodiments, a maximum playback delay time and/or a minimum playback delay time are determined.

Figure 9:
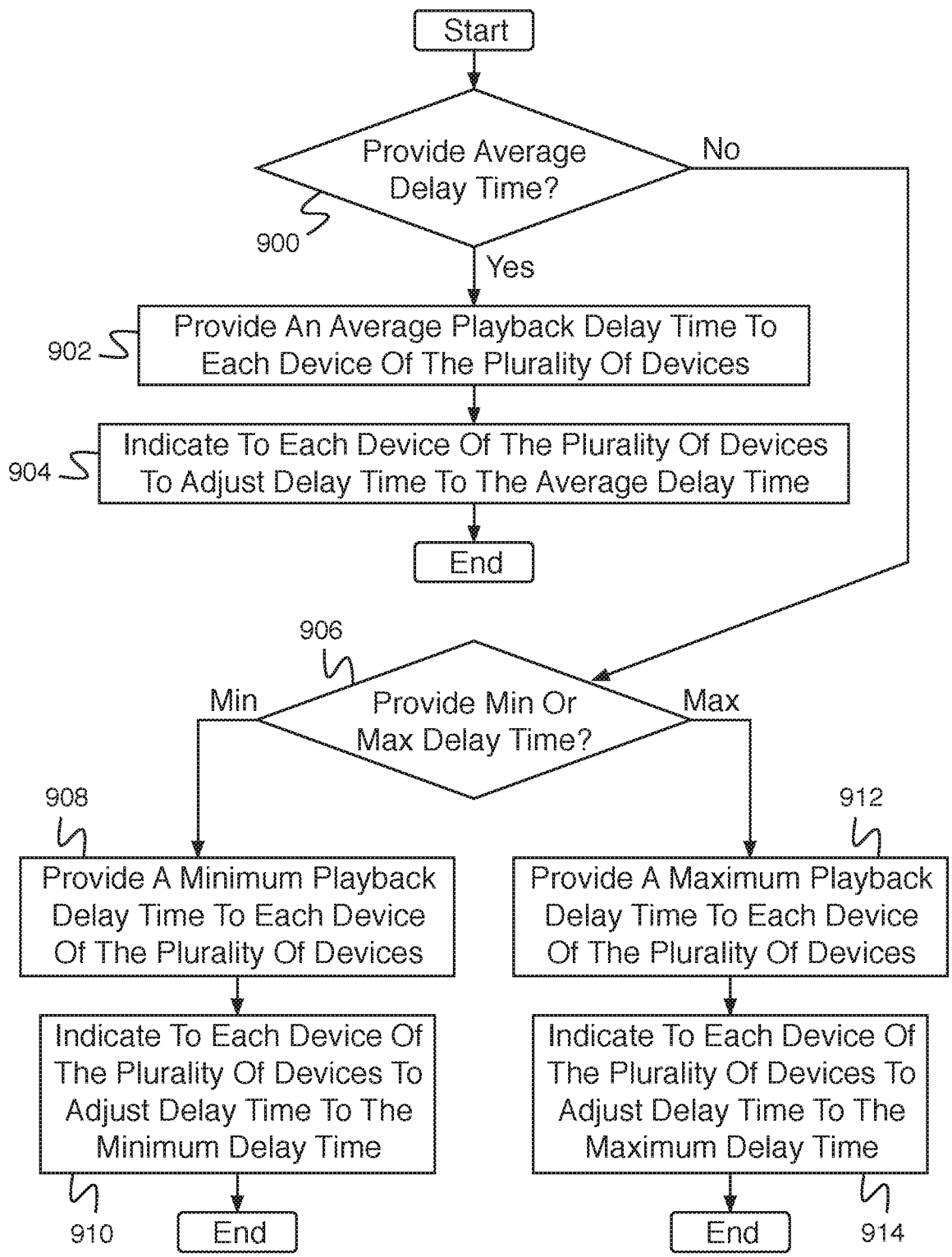
FIG. 9 is a flow diagram illustrating an embodiment of a process for providing video playback positions to a plurality of devices.

FIG. 9 is a flow diagram illustrating an embodiment of a process for providing video playback positions to a plurality of devices. In some embodiments, the process of FIG. 9 implements 416 of FIG. 4. In the example shown, in 900, it is determined whether to provide the average delay time. For example, it is determined whether to provide the average delay time according to a default setting, according to an administrator setting, etc. In response to determining not to provide the average delay time, control passes to 906. In response to determining to provide the average delay time, control passes to 902. In 902, an average delay time is provided to each device of the plurality of devices. In 904, the process indicates to each device of the plurality of devices to adjust delay time to the average delay time. The process then ends. in 906, it is determined whether to provide a minimum or a maximum delay time. In response to determining to provide a maximum delay time, control passes to 912. In response to determining to provide a minimum delay time, control passes to 908. In 908, a minimum playback delay time is provided to each device of the plurality of devices. In 910, the process indicates to each device of the plurality of devices to adjust delay time to the minimum delay time. The process then ends. In 912, a maximum playback delay time is provided to each device of the plurality of devices. In 914, the process indicates to each device of the plurality of devices to adjust delay time to the maximum delay time.

Figure 10:
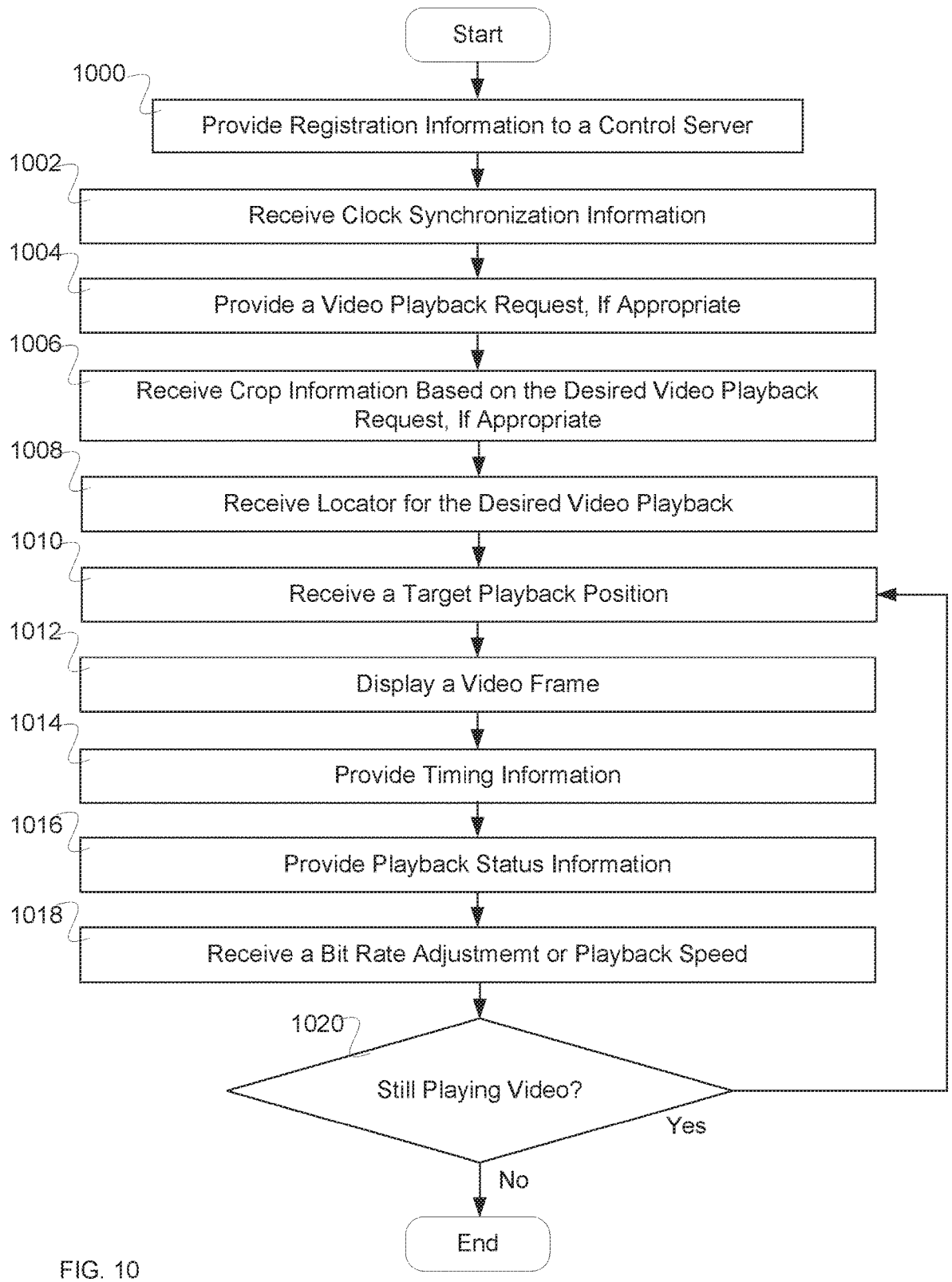
FIG. 10 is a flow diagram illustrating an embodiment of a process for displaying synchronized video.

FIG. 10 is a flow diagram illustrating an embodiment of a process for displaying synchronized video. In some embodiments, the process of FIG. 10 is executed by video playback device 104 of FIG. 1, video playback device 106 of FIG. 1, video playback device 108 of FIG. 1, or video playback device 110 of FIG. 1. In the example shown, in 1000, registration information is provided to a control server. In 1002, clock synchronization information is received. In 1004, a video playback request is provided, if appropriate. In 1006, crop information is received based on the desired video playback request, if appropriate. In 1008, a locator for the desired video playback is received. In 1010, a target playback position is received. In 1012, a video frame is displayed. In 1014, timing information is provided. In 1016, playback status information is provided. In 1018, a bit rate adjustment or a playback speed is received. In 1020, it is determined whether video is still playing. In response to determining that video is still playing, control passes to 1010. In response to determining that the video is not still playing, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing video playback, comprising:
    an interface configured to:
        receive a desired video playback request for a plurality of devices,
        wherein the plurality of devices includes a first device and a second device; and
        receive timing information from the plurality of devices, comprising to:
            receive a first clock time and a first playback position from the first device; and
            receive a second clock time and a second playback position from the second device; and
    a processor configured to:
        synchronize clocks on the plurality of devices to a standard time;
        determine a first playback delay time for the first device based on the standard time, the first clock time, and the first playback position;
        determine a second playback delay time for the second device based on the standard time, the second clock time, and the second playback position;
        determine a third playback delay time based on the first playback delay time and the second playback delay time;
        provide the third playback delay time to the first device and the second device;
        indicate to the first device and the second device to adjust delay time to the third playback delay time;
        provide target video playback positions to the plurality of devices, wherein target video playback positions are based at least in part on the timing information,
        provide one or more locators for video streams to the plurality of devices;
        monitor playback status for each of the plurality of devices;
        for a device of the plurality of devices:
            determine whether the playback status for the device of the plurality of devices indicates that a selected bitrate is too low or too high or that a playback is fast or slow; and
            in response to determining that the playback is fast, indicate to decrease playback speed or pause on the device;
            in response to determining that the playback is slow, indicate to increase playback speed or drop frames on the device;
            in response to determining that the selected bitrate is too low, indicate to select a higher bitrate for the device of the plurality of devices; and
            in response to determining that the selected bitrate is too high, indicate to select a lower bitrate for the device of the plurality of devices.

2. The system of claim 1, wherein the interface is further configured to receive registration information from the plurality of devices.

3. The system of claim 2, wherein the processor is further configured to store the registration information from the plurality of devices.

4. The system of claim 1, wherein the interface is further configured to receive the standard time from a timing standard.

5. The system of claim 4, wherein the standard time is received using a Network Time Protocol.

6. The system of claim 1, wherein the desired video playback request for the plurality of devices comprises a plurality of streams on the plurality of devices.

7. The system of claim 1, wherein the desired video playback request for the plurality of devices comprises a single stream on the plurality of devices.

8. The system of claim 1, wherein the desired video playback request for the plurality of devices comprises layout information indicating a portion of a video frame to display.

9. The system of claim 8, wherein the processor is further configured to crop a video stream of the video streams according to the layout information.

10. The system of claim 1, wherein the processor is further configured to provide IP address information for the plurality of devices to each of the plurality of devices.

11. The system of claim 1, wherein the first clock time and the first playback location and the second clock time and the second playback location are sent after a frame is rendered.

12. The system of claim 1, wherein monitoring playback status comprises monitoring a playback location offset, a rebuffering rate, and a frame drop rate.

13. The system of claim 12, wherein determining that the playback status is slow is based at least in part on a playback location offset, a rebuffering rate, and a frame drop rate.

14. The system of claim 1, wherein the processor is further configured to:
    for a device of the plurality of devices:
        determine whether the playback status indicates that the playback is normal.

15. The system of claim 14, wherein, in response to determining the playback is normal, determine whether to increase a bit rate to the device.

16. A method for providing video playback, comprising:
- receiving a desired video playback request for a plurality of devices, wherein the plurality of devices includes a first device and a second device;
- receiving timing information from the plurality of devices, comprising:
  - receiving a first clock time and a first playback position from the first device; and
  - receiving a second clock time and a second playback position from the second device;
- synchronizing, using a processor, clocks on the plurality of devices to a standard time;
- determining a first playback delay time for the first device based on the standard time, the first clock time, and the first playback position;
- determining a second playback delay time for the second device based on the standard time, the second clock time, and the second playback position;
- determining a third playback delay time based on the first playback delay time and the second playback delay time;
- providing the third playback delay time to the first device and the second device;
- indicating to the first device and the second device to adjust delay time to the third playback delay time;
- providing target video playback positions to the plurality of devices;
- providing one or more locators for video streams to the plurality of devices;
- monitoring playback status for each of the plurality of devices, wherein playback status is based at least in part on the timing information; and
- for a device of the plurality of devices:
  - determining whether the playback status for the device of the plurality of devices indicates that a selected bitrate is too low or too high or that a playback is fast or slow; and
  - in response to determining that the playback is fast, indicating to decrease playback speed or pause on the device;
  - in response to determining that the playback is slow, indicating to increase playback speed or drop frames on the device;
  - in response to determining the selected bitrate is too low, indicating to select a higher bitrate for the device of the plurality of devices; and
  - in response to determining the selected bitrate is too high, indicating to select a lower bitrate for the device of the plurality of devices.

17. A computer program product for providing video playback, the computer program product being embodied in a non-transitory computer readable storage medium and comprising computer instructions for:
- receiving a desired video playback request for a plurality of devices, wherein the plurality of devices includes a first device and a second device;
- receiving timing information from the plurality of devices, comprising:
  - receiving a first clock time and a first playback position from the first device; and
  - receiving a second clock time and a second playback position from the second device;
- synchronizing clocks on the plurality of devices to a standard time;
- determining a first playback delay time for the first device based on the standard time, the first clock time, and the first playback position;
- determining a second playback delay time for the second device based on the standard time, the second clock time, and the second playback position;
- determining a third playback delay time based on the first playback delay time and the second playback delay time;
- providing the third playback delay time to the first device and the second device;
- indicating to the first device and the second device to adjust delay time to the third playback delay time;
- providing target video playback positions to the plurality of devices;
- providing one or more locators for video streams to the plurality of devices;
- monitoring playback status for each of the plurality of devices, wherein playback status is based at least in part on the timing information; and
- for a device of the plurality of devices:
  - determining whether the playback status for the device of the plurality of devices indicates that a selected bitrate is too low or too high or that a playback is fast or slow; and
  - in response to determining that the playback is fast, indicating to decrease playback or pause on the device;
  - in response to determining that the playback is slow, indicating to increase playback or drop frames on the device;
  - in response to determining the selected bitrate is too low, indicating to select a higher bitrate for the device of the plurality of devices; and
  - in response to determining the selected bitrate is too high, indicating to select a lower bitrate for the device of the plurality of devices.

18. The system of claim 1, wherein the third playback delay time includes an average playback delay time or one or more of the following: a minimum playback delay time and/or a maximum playback delay time.

\* \* \* \* \*